(12) United States Patent
Tanaka et al.

(10) Patent No.: US 7,629,279 B2
(45) Date of Patent: Dec. 8, 2009

(54) GLASS FIBER

(75) Inventors: Toshikatsu Tanaka, Otsu (JP); Shinji Nishibori, Otsu (JP); Hiroki Mochizuki, Otsu (JP); Motoyoshi Sugiyama, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 619 days.

(21) Appl. No.: 10/531,641

(22) PCT Filed: Oct. 15, 2003

(86) PCT No.: PCT/JP03/13170

§ 371 (c)(1),
(2), (4) Date: Oct. 17, 2005

(87) PCT Pub. No.: WO2004/035497

PCT Pub. Date: Apr. 29, 2004

(65) Prior Publication Data

US 2006/0165968 A1   Jul. 27, 2006

(30) Foreign Application Priority Data

Oct. 15, 2002  (JP) ............................. 2002-299865
Jun. 19, 2003  (JP) ............................. 2003-175411
Jun. 20, 2003  (JP) ............................. 2003-175699

(51) Int. Cl.
*C03C 3/06* (2006.01)
*C03C 3/00* (2006.01)

(52) U.S. Cl. .......................................... 501/36; 501/35

(58) Field of Classification Search ............... 501/35, 501/36
See application file for complete search history.

(56) References Cited

U.S. PATENT DOCUMENTS

| 3,887,386 | A | | 6/1975 | Majumdar ................. 106/99 |
| 3,928,049 | A | | 12/1975 | Otouma et al. .............. 106/50 |
| 5,284,807 | A | * | 2/1994 | Komori et al. .............. 501/35 |
| 5,332,699 | A | * | 7/1994 | Olds et al. .................. 501/36 |
| 5,334,645 | A | | 8/1994 | Komori et al. ............. 524/494 |
| 5,407,872 | A | * | 4/1995 | Komori et al. .............. 501/35 |
| 5,691,255 | A | * | 11/1997 | Jensen et al. ............... 501/36 |
| 5,714,421 | A | * | 2/1998 | Olds et al. .................. 501/36 |
| 5,857,494 | A | * | 1/1999 | Tsukamoto et al. ......... 138/140 |
| 6,245,419 | B1 | * | 6/2001 | Hakotani et al. ............ 428/221 |
| 6,268,304 | B1 | * | 7/2001 | Maeda et al. ............... 501/65 |
| 2002/0056508 | A1 | * | 5/2002 | Brandstrom ................ 156/180 |
| 2003/0012600 | A1 | * | 1/2003 | Kaneko et al. .............. 404/32 |
| 2003/0021993 | A1 | * | 1/2003 | Bellasalma ................. 428/375 |

FOREIGN PATENT DOCUMENTS

| EP | 500325 A1 * | 8/1992 |
| JP | 53-102325 | 9/1978 |
| JP | 04-367537 | 12/1992 |
| JP | 05-085767 | 4/1993 |
| JP | 5-85767 | 4/1993 |
| JP | 10-120438 | 5/1998 |
| JP | 2000-247683 | 9/2000 |

* cited by examiner

*Primary Examiner*—Karl E Group
*Assistant Examiner*—Elizabeth A Bolden
(74) *Attorney, Agent, or Firm*—J.C. Patents

(57) ABSTRACT

The glass fiber of the present invention is formed of the glass composition including 50 to 60% $SiO_2$, 0.1 to 10% $Al_2O_3$, 20 to 45% MgO+CaO+SrO+BaO, 0.5 to 20% $TiO_2$, 0.1 to 10% $ZrO_2$, and 0 to 2% $Li_2O+Na_2O+K_2O$ in terms of mol %, in which a BaO/CaO mol ratio is from 0.3 to 1.6.

11 Claims, No Drawings

GLASS FIBER

TECHNICAL FIELD

The present invention relates to glass composition and glass fiber.

BACKGROUND ART $ZrO_2$ or $TiO_2$ has been heretofore known as a component capable of improving alkali resistance, acid resistance, or mechanical strength of glass used for glass fiber. However, the glass containing a large amount of $ZrO_2$ or $TiO_2$ has considerably high devitrification temperature. So, a devitrified product tends to be deposited during fiber spinning at a bottom of a platinum pot used for spinning, which is called bushing with 200 to 4000 small holes at the bottom. And pulling of glass filaments out of the bushing is interrupted, easily causing thread breakage.

Further, industrial mass production of glass fiber generally must involve spinning at an appropriate temperature for fiber forming, the so-called spinning temperature (temperature at which a melt viscosity becomes $10^3$ poise). At a temperature exceeding a temperature allowing glass fiber forming, that is, at a temperature at which the molten glass viscosity becomes $10^{2.5}$, glass filaments break and the spinning cannot be carried out. Alternatively, at a temperature lower than the spinning temperature, the glass viscosity increases excessively and glass filaments are hardly pulled out of the bushing.

However, even at the spinning temperature, deposition of a devitrified product at a bottom of the bushing prevents pulling of glass filaments out of the bushing, easily causing thread breakage.

Thus, in order to allow industrial mass production of glass fiber containing a large amount of $ZrO_2$ or $TiO_2$ without deposition of a devitrified product, a devitrification temperature ($T_y$) of glass must be reduced such that the devitrification temperature does not exceed a spinning temperature ($T_x$) and a difference between the temperatures ($T_x$-$T_y$) is at least 70° C.

Examples of the glass composition containing a large amount of $ZrO_2$ or $TiO_2$, capable of reducing a devitrification temperature of glass and having a difference between the spinning temperature and the devitrification temperature of 70° C. or more, include: glass composition containing alkali metal oxides which are collectively a component for suppressing devitrification of glass (see JP 05-85767 A, for example); and glass composition containing $Nb_2O_5$, $La_2O_3$, and the like (see JP 10-120438 A, JP 8-25771 A, and Japanese Patent No. 2617632, for example).

Meanwhile, aging of large concrete structures such as bridges has recently progressed and emerged as a problem mainly in cold regions of North America. That is, in the cold regions, when snow, rain, or the like falls on a bridge and the bridge freezes, a large amount of a snow melting agent is used to melt the snow or ice. As a result, reinforcing steel employed as a reinforcement for concrete rusts due to chloride ions in the snow melting agent. Strength of the reinforcing steel as a reinforcement degrades, and the concrete ages rapidly.

It is also pointed in Japan that cracks formed in a concrete wall of a tunnel or the like cause rusting of the reinforcing steel, which may lead to a big accident such as falling off of concrete pieces.

Thus, in civil engineering and construction industries, an alternative material for reinforcing steel accelerating rapid aging of concrete due to rust formation has attracted attention, and glass fiber, FRP rod prepared by hardening a resin with a glass fiber, or the like has been studied as the alternative material. The glass fiber used for such applications is buried in concrete having strong alkalinity, and thus must have alkali resistance and mechanical strength for supporting a large concrete structure.

The glass composition disclosed in JP 05-85767 A has large amounts of $ZrO_2$ and $TiO_2$ for maintaining alkali resistance and mechanical strength of glass, and contains large amounts of alkali metal oxides for suppressing devitrification during spinning. However, it is pointed out that alkali metal ions easily elute from glass because the glass composition contains large amounts of alkali metal oxides, and that a glass structure gradually breaks to cause strength degradation of glass fiber. Further, the glass fiber employed as a reinforcement for an FRP rod has a problem in bonding with a matrix resin. The bonding is weakened due to alkali metal ions eluted from glass, and that a mechanical strength of the FRP rod is degraded.

The glass compositions disclosed in JP 10-120438 A, JP 8-25771 A, and Japanese Patent No. 2617632 each contains large amounts of $ZrO_2$ and $TiO_2$ for improving alkali resistance, and contains $Nb_2O_5$ or $La_2O_3$ for suppressing devitrification during spinning. However, $Nb_2O_5$ or $La_2O_3$ is a very expensive component and extensively deforms the network of glass formed of $SiO_2$ and the like. The glass improves in elastic modulus, but becomes brittle and has a significantly degraded tensile strength. Thus, the glass fiber formed of the glass composition containing $Nb_2O_5$ or $La_2O_3$ has an increased unit material cost and is not suitable as a reinforcement for a large concrete structure under large stress.

DISCLOSURE OF THE INVENTION

An object of the present invention is therefore to provide the glass composition and the glass fiber each having excellent alkali and acid resistance, capable of suppressing devitrification during spinning, having hardly eluting alkali metal ions, and having excellent bonding with a resin to suitably serve as a reinforcement for the glass fiber-reinforced plastics.

The inventors of the present invention have found that the glass composition and the glass fiber each having excellent alkali and acid resistance, capable of suppressing devitrification during spinning, having hardly eluting alkali metal ions, and having excellent bonding with a resin to suitably serve as a reinforcement for the glass-fiber reinforced plastics can be obtained by: including as essential ingredients $TiO_2$, $ZrO_2$, CaO, BaO, $Al_2O_3$, and $SiO_2$; adjusting an appropriate BaO/CaO mol ratio; and suppressing a total content of alkali metal oxides to 2 mol % or less. Thus, the inventors propose the glass composition and the glass fiber in the present invention.

That is, the glass composition of the present invention is characterized by having the composition including 50 to 60% $SiO_2$, 0.1 to 10% $Al_2O_3$, 20 to 45% MgO+CaO+SrO+BaO, 0.5 to 20% $TiO_2$, 0.1 to 10% $ZrO_2$, and 0 to 2% $Li_2O+Na_2O+K_2O$ in terms of mol %, in which a BaO/CaO mol ratio is from 0.3 to 1.6.

Further, the glass fiber of the present invention is characterized by being formed of the glass composition having the composition including 50 to 60% $SiO_2$, 0.1 to 10% $Al_2O_3$, 20 to 45% MgO+CaO+SrO+BaO, 0.5 to 20% $TiO_2$, 0.1 to 10% $ZrO_2$, and 0 to 2% $Li_2O+Na_2O+K_2O$ in terms of mol %, in which a BaO/CaO mol ratio is from 0.3 to 1.6.

The present invention provides glass fiber-reinforced plastics, glass fiber-reinforced thermosetting plastics, FRP rods, FRP pipes, sewage pipes, a sheet molding compound, a bulk molding compound, and glass fiber-reinforced thermoplastics each employing as a reinforcement the glass fiber described above.

Further, the present invention provides the glass fabrics employing the glass fiber described above, and a repairing material for a cement-based material employing as a reinforcement the glass fabrics.

The glass composition of the present invention includes 50 to 60% $SiO_2$, 0.1 to 10% $Al_2O_3$, 20 to 45% MgO+CaO+SrO+BaO, 0.5 to 20% $TiO_2$, 0.1 to 10% $ZrO_2$, and 0 to 2% $Li_2O+Na_2O+K_2O$ in terms of mol %, in which a BaO/CaO mol ratio is from 0.3 to 1.6, and thus has excellent alkali and acid resistance, is capable of suppressing devitrification during spinning, has hardly eluting alkali metal ions, and has excellent bonding with a resin to suitably serve as a reinforcement for the glass fiber-reinforced plastics. That is, the glass composition of the present invention contains $TiO_2$ and $ZrO_2$, and thus has excellent alkali and acid resistance. Further, the glass composition of the present invention has an appropriate mol ratio of BaO to CaO, and thus can suppress devitrification during spinning without inclusion of alkali metal oxides, $Nb_2O_5$, or $La_2O_3$. The glass composition has a devitrification temperature not exceeding a spinning temperature, has a difference between the temperatures of 70° C. or more, facilitates the glass fiber forming, and allows industrial mass production thereof. The glass composition contains substantially no alkali metal oxides or contains alkali metal oxides of 2 mol % or less, and thus the alkali metal ions hardly elute.

Next, reasons for limitations of components in the glass composition of the present invention within the above respective ranges will be described.

$SiO_2$ is a component for forming the network of glass, and a content thereof is 50 to 60 mol %. A $SiO_2$ content of less than 50 mol % is not preferable because the mechanical strength of the glass significantly degrades. A SiO2 content of more than 60 mol % is not preferable because devitrification occurs easily and glass fiber forming becomes difficult.

$Al_2O_3$ is a component for stabilizing glass to suppress devitrification, and a content thereof is 0.1 to 10 mol %, preferably 0.2 to 7.5 mol %. An $Al_2O_3$ content of less than 0.1 mol % is not preferable because devitrification occurs easily. An $Al_2O_3$ content of more than 10 mol % is not preferable because alkali resistance deteriorates.

An alkali earth oxide of MgO, CaO, SrO, or BaO is a component for facilitating glass fiber forming by improving melting property of the glass and reducing the viscosity of the glass. A total content of MgO, CaO, SrO, and BaO is 20 to 45 mol %, preferably 23 to 40 mol %. A total content thereof of less than 20 mol % is not preferable because the melting property of the glass deteriorates and the viscosity of the glass increases, to cause difficulties in melting of the glass. A total content thereof of more than 45 mol % is not preferable because a devitrification temperature increases to cause difficulties in glass fiber forming.

Further, a MgO content is 0 to 15 mol %, preferably 0 to 11%, and a CaO content is 1 to 15 mol %, preferably 4 to 12.5 mol %. A SrO content is 0 to 15%, preferably 5.5 to 11.5 mol %, and a BaO content is 1 to 15 mol %, preferably 5.5 to 12 mol %. Each content of MgO, CaO, SrO, or BaO of more than 15 mol % is not preferable because a devitrification temperature increases to cause difficulties in glass fiber forming. Each content of CaO or BaO of less than 1 mol % is not preferable because the melting property of the glass deteriorates and the viscosity of the glass increases, to cause difficulties in glass fiber forming.

$TiO_2$ is a component for improving alkali resistance and mechanical strength of glass, and a content thereof is 0.5 to 20 mol %, preferably 6.5 to 13 mol %. A $TiO_2$ content of less than 0.5 mol % is not preferable because the desired alkali resistance and mechanical strength of the glass cannot be obtained. A $TiO_2$ content of more than 20 mol % is not preferable because a devitrification temperature increases to cause difficulties in glass fiber forming.

$ZrO_2$ is a component for improving alkali resistance, acid resistance, and mechanical strength of glass, and a content thereof is 0.1 to 10 mol %, preferably 0.5 to 6.5 mol %. A $ZrO_2$ content of less than 0.1 mol % is not preferable because the desired alkali resistance, acid resistance, and mechanical strength of glass cannot be obtained. A $ZrO_2$ content of more than 10 mol % is not preferable because a devitrification temperature increases to cause difficulties in glass fiber forming.

An alkali metal oxide of $Li_2O$, $Na_2O$, or $K_2O$ is a component for improving melting property of glass and for adjusting the viscosity of the glass. A total content of $Li_2O$, $Na_2O$, and $K_2O$ is 0 to 2 mol %, preferably 0 to 1 mol %. A total content thereof of more than 2 mol % is not preferable because alkali metal ions elute easily from the glass.

Further, the glass composition of the present invention contains $Nb_2O_5$ and $La_2O_3$ in a total content of 0 to 1 mol %, and preferably contains substantially no $Nb_2O_5$ and $La_2O_3$. A total content thereof of more than 1 mol % is not preferable because a production cost of glass increases and the glass becomes brittle to degrade the tensile strength thereof.

A ratio of BaO to CaO, that is, BaO/CaO is 0.3 to 1.6, preferably 0.75 to 1.45 in mol ratio. A BaO/CaO mol ratio of less than 0.3 or more than 1.6 is not preferable because a devitrification temperature of the glass increases to cause difficulties in glass fiber forming.

A ratio of SrO to CaO, that is, SrO/CaO is 0.3 to 2.0, preferably 0.55 to 2.0 in mol ratio. An SrO/CaO mol ratio of less than 0.3 or more than 2.0 is not preferable because a devitrification temperature of the glass increases to cause difficulties in glass fiber forming.

A ratio of MgO to CaO, that is, MgO/CaO is 0 to 2.0, preferably 0.3 to 1.6 in mol ratio. A MgO/CaO mol ratio of more than 2.0 is not preferable because a devitrification temperature of the glass increases to cause difficulties in glass fiber forming.

$B_2O_3$ is a component for forming the network of glass, similar to $SiO_2$, and is a component for improving melting property of the glass by reducing the viscosity of the glass and reducing a melting temperature of the glass. A content thereof is 0 to 10 mol %, and a $B_2O_3$ content of more than 10 mol % is not preferable because devitrification occurs easily to cause difficulties in glass fiber forming.

The glass composition of the present invention may contain $As_2O_3$, $SnO_2$, ZnO, $Sb_2O_3$, $F_2$, $P_2O_5$, or the like properlyadded, in addition to the components described above.

The glass composition of the present invention may contain at most 0.5 mol % $Fe_2O_3$.

The glass fiber of the present invention is formed of the glass composition described above. Thus, a glass fiber-reinforced resin employing as a reinforcement the glass fiber such as glass fiber-reinforced thermosetting plastics or glass fiber-reinforced thermoplastics has excellent bonding between the glass fiber and a matrix resin hardly weakened by alkali metal ions. Specific examples of the glass fiber-reinforced thermosetting plastics include: a reinforcement used for repairing an FRP rod, a concrete structure, or the like, used in applications of reinforcing steel alternative and the like; a reinforcement for a glass fiber-reinforced plastic pipe or the like used for a sewage pipe or the like; a reinforcement used for a sheet molding compound (SMC); and a reinforcement used for a bulk molding compound (BMC). The glass fiber-reinforced thermoplastics are used for kitchen appliances, sanitary products, automobile parts, electrical and electronic parts, and the like. Thus, the glass fiber-reinforced plastics have hardly degraded initial mechanical strength, and hardly degraded mechanical strength even after exposure to an acid or alkali environment for a long period of time.

The glass fiber of the present invention employed as a reinforcement for an FRP rod or a reinforcement for a glass-fiber-reinforced plastic pipe used for a sewage pipe or the like is preferably prepared by applying on a surface a sizing containing silane coupling agent, and epoxy resin or polyester resin. Silane coupling agent easily bonds with the surface of the glass fiber. Silane coupling agent has a functional group having high affinity with a resin and introduced into a terminal, and thus strongly bonds with polyester resin or epoxy resin on the surface of the glass fiber or in the sizing, or with a matrix resin. Polyester resin or epoxy resin has favorable adhesive property with an unsaturated polyester resin, vinyl ester resin, epoxy resin, or the like, which is the matrix resin of the glass fiber-reinforced resin.

Further, the glass fiber of the present invention is preferably prepared by applying on the surface a sizing containing methacryl silane and ureido silane, to thereby serve as a reinforcement suitable for glass fiber-reinforced plastics employing as a matrix resin unsaturated polyester resin or vinyl ester resin. That is, methacryl silane improves bonding between the unsaturated polyester resin or vinyl ester resin and the surface of the glass fiber. Ureido silane improves affinity between the unsaturated polyester resin or vinyl ester resin and the surface of the glass fiber to promote improvement in bonding between the unsaturated polyester resin or vinyl ester resin and the surface of the glass fiber. Thus, the mechanical strength of glass fiber-reinforced thermosetting plastics improves. Further, even when the glass fiber-reinforced thermosetting plastics are exposed to an alkali or acid solution, the alkali or acid solution hardly permeates into the glass fiber-reinforced thermosetting plastics.

Methacryl silane content in the sizing is preferably 0.2 to 1.0 mass % in solid equivalent. Methacryl silane content of less than 0.2% hardly provides the above-described effects, and Methacryl silane content of more than 1.0% does not improve the above-described effects and thus is not economical. Ureido silane content in the sizing is preferably 0.05 to 0.6 mass % in solid equivalent. Ureido silane content of less than 0.05% hardly provides the above-described effects, and Ureido silane content of more than 1.0% does not improve the above-described effects and thus is not economical.

Further, the glass fiber of the present invention is preferably prepared by applying on the surface a sizing containing epoxy silane and ureido silane, to thereby serve as a reinforcement suitable for glass fiber-reinforced plastics employing as a matrix resin epoxy resin. That is, epoxy silane improves bonding between the epoxy resin and the surface of the glass fiber. Ureido silane improves affinity between the epoxy resin and the surface of the glass fiber to promote improvement in bonding between the epoxy resin and the surface of the glass fiber. Thus, the mechanical strength of the glass fiber-reinforced thermosetting plastics improves. Further, even when the glass fiber-reinforced thermosetting plastics are exposed to an alkali or acidic solution, the alkali or acid solution hardly permeates into the glass fiber-reinforced thermosetting plastics.

Epoxy silane content in the sizing is preferably 0.2 to 1.0 mass % in solid equivalent. Epoxy silane content of less than 0.2% hardly provides the above-described effects, and epoxy silane content of more than 1.0% does not improve the above-described effects and thus is not economical. Ureido silane content in the sizing is preferably 0.05 to 0.6 mass % in solid equivalent. Ureido silane content of less than 0.05% hardly provides the above-described effects, and ureido silane content of more than 1.0% does not improve the above-described effects and thus is not economical.

A preferable example of methacryl silane is γ-methacryloxypropyltrimethoxysilane. A preferable example of epoxy silane is γ-glycidoxypropyltrimethoxysilane. A preferable example of ureido silane is γ-ureidopropyltriethoxysilane.

Preferable examples of polyester resin include bisphenol A-based unsaturated polyester resin, saturated polyester resin derived from aliphatic acid and glycol, and maleic acid-based unsaturated polyester resin. A preferable example of the epoxy resin is a liquid epoxy resin having a low molecular weight.

Further, the glass fiber of the present invention employed as a reinforcement for a sheet molding compound, which is a repairing material for a sewage pipe or the like, is preferably prepared by applying on a surface a sizing containing silane coupling agent, vinyl acetate resin, and cationic softening agent. The silane coupling agent of the glass fiber employed as a reinforcement for a sheet molding compound is not particularly limited, but preferable examples thereof include γ-methacryloxypropyltrimethoxysilane, γ-ureidopropyltriethoxysilane, and γ-glycidoxypropyltrimethoxysilane.

Further, the glass fiber of the present invention employed as a reinforcement for a bulk molding compound or a reinforcement for fiber-reinforced thermoplastics used for kitchen appliances, sanitary products, automobile parts, and electrical and electronic parts, and the like is preferably prepared by applying on a surface a sizing containing at least one coupling agent. The silane coupling agent includes at least one silane coupling agent selected from the group consisting of methacryl silane, epoxy silane, ureido silane, aminosilane, vinyl silane, styrylsilane, acryloxysilane, chloropropylsilane, mercaptosilane, sulfidosilane, and isocyanate silane. The silane coupling agent easily bonds with the surface of the glass fiber. The silane coupling agent has a functional group having high affinity with a resin and introduced into a terminal, and thus strongly bonds with a binder on the surface of the glass fiber or in the sizing. The silane coupling agent provides favorable adhesive property between the glass resin and a matrix resin, and thus an alkali or acid component hardly penetrates into an interface between the glass fiber and the matrix resin. The glass fiber is preferably prepared by applying on the surface a sizing containing at least one binder selected from the group consisting of epoxy resin, urethane resin, isocyanate resin, acrylic resin, modified polypropylene resin, vinyl acetate resin, and polyester resin. The binder has excellent adhesive property with the matrix resin, and thus an alkali or acid component hardly penetrates into an interface between the glass fiber and the matrix resin.

An amount of the sizing on the surface of the glass fiber (LOI; loss on ignition) of the present invention is preferably 0.1 to 2.0 mass %. LOI less than 0.1 mass % provides poor bonding between the glass fiber and the matrix resin and a small effect of improving the mechanical strength. Further, LOI less than 0.1 mass % provides a small effect of suppressing penetration of an alkali or acid solution when the glass fiber-reinforced plastics, in particular, a repairing material for an FRP rod, a concrete structure, or the like used in applications of reinforcing steel alternative and the like, a glass fiber-reinforced plastics for sewage pipe or the like, a sheet molding compound (SMC), a bulk molding compound (BMC), or glass fiber-reinforced thermoplastics are exposed to the alkali or acid solution. Further, LOI less than 0.1 mass % provides a small effect of protecting a glass monofilament, and thus troubles due to breaking of a glass monofilament easily occur in production of a glass fabric, a glass fiber-reinforced plastic pipe, a sheet molding compound, a bulk molding compound, or a glass fiber-reinforced thermoplastics. LOI more than 2.0 mass % does not improve the above-described effects and is not preferable from the viewpoints of economical efficiency and resource saving.

The sizing used in the present invention may contain an animal/vegetable oil, paraffin wax, a lubricant, an antistatic agent, or the like added as required, in addition to the silane coupling agent or the binder.

The FRP rod of the present invention employs as a reinforcement the above-described glass fiber, and thus has hardly degraded initial mechanical strength, and hardly degraded mechanical strength even after exposure to an acid or alkali environment for a long period of time. Thus, the FRP rod of the present invention is suitable for an alternative material for reinforcing steel used as a reinforcement for concrete.

The glass fabric of the present invention employs the above-described glass fiber. Thus, the glass fabric of the present invention has excellent alkali and acid resistance, has hardly eluting alkali metal ions, and has favorable affinity with a resin to suitably serve as a reinforcement for a repairing material for a cement-based material.

The repairing material for a cement-based material of the present invention employs as a reinforcement the above-mentioned glass fabric, and thus has hardly degraded initial mechanical strength, and hardly degraded mechanical strength even after exposure to an alkali environment, that is, to an alkali component in the cement for a long period of time. Note that, the cement-based material refers to concrete or mortar, and the repairing material refers to glass fabric impregnated with a matrix material such as resin mortar, an epoxy resin, or an acrylic resin for repairing cracks in concrete or mortar.

The glass fiber-reinforced plastic pipe of the present invention employs as a reinforcement the above-described glass fiber, and thus has hardly degraded initial mechanical strength, and hardly degraded mechanical strength even after exposure to an acid or alkali environment for a long period of time.

A typical example of the glass fiber-reinforced plastic pipe is a sewage pipe. High acid resistance is required for the sewage pipe because organic substances in sewage consume dissolved oxygen and decompose to produce hydrogen sulfide which undergoes sulfation by aerobic sulfur-oxidizing bacteria in air, and these wage acidifies. The sewage pipe of the present invention employs as a reinforcement the above-described glass fiber. Thus, corrosion of the sewage pipe hardly progresses even if the sewage acidifies, and the sewage pipe hardly cracks and leaks water. It has high durability. The sewage pipe of the present invention has high initial mechanical strength and excellent alkali resistance.

As a matrix resin used for the glass fiber-reinforced resin pipe of the present invention, a thermoplastic resin may be used in addition to the thermosetting resin. Examples of the thermosetting resin that can be used include an epoxy resin, an unsaturated polyester resin, and a vinyl ester resin. Examples of the thermoplastic resin include a polypropylene resin, a polyethylene resin, and a polysulfone resin.

A glass fiber content in the glass fiber-reinforced plastic pipe is preferably 50 to 80 mass %.

The glass fiber-reinforced plastic pipe of the present invention can be produced through so-called filament winding method: immersing a bundle of glass roving in a resin tank for impregnation with a resin; and winding the impregnated bundle around a rotating mandrel for heat curing. Alternatively, the glass fiber-reinforced plastic pipe of the present invention can be produced through so-called centrifugal method: rotating a pipe-shaped mold; and placing on the inner surface of the pipe-shaped mold the glass fiber in a shape of chopped strands, mats, fabrics, or the like and a matrix resin poured into the mold for heat curing.

The sheet molding compound of the present invention employs as a reinforcement the above-described glass fiber, and thus has hardly degraded initial mechanical strength, and hardly degraded mechanical strength even after exposure to an acid or alkali environment for a long period of time. When the sheet molding compound of the present invention used as a repairing material (pipe lining material) for a sewage pipe, in particular, corrosion of the sewage pipe hardly progresses and the repaired surface hardly cracks and leaks water, even if organic substances in sewage consume dissolved oxygen and decompose to produce hydrogen sulfide which undergoes sulfation by aerobic sulfur-oxidizing bacteria in air, and the sewage acidifies.

The matrix resin of the sheet molding compound of the present invention is not particularly limited, but is preferably an unsaturated polyester resin having high acid resistance and contains a shrinkage reducing agent, an inorganic filler, a curing agent, or the like.

A glass fiber content in the sheet molding compound of the present invention is preferably 20 to 70 mass %.

The bulk molding compound of the present invention employs as a reinforcement the above-described glass fiber, and thus has hardly degraded initial mechanical strength, and hardly degraded mechanical strength even after exposure to an acidic or alkali environment for a long period of time. The bulk molding compound of the present invention is suitable for applications such as kitchen appliances, sanitary products, automobile parts, and electrical and electronic parts.

Preferable examples of the matrix resin of the bulk molding compound include an unsaturated polyester resin and a phenol resin each having high corrosion resistance to acid and alkali.

The glass fiber-reinforced thermoplastics of the present invention employs as a reinforcement the above-described glass fiber, and thus has hardly degraded initial mechanical strength, and hardly degraded mechanical strength even after exposure to an acid or alkali environment for a long period of time. The glass fiber-reinforced thermoplastics of the present invention is suitable for applications such as kitchen appliances, sanitary products, automobile parts, and electrical and electronic parts.

Examples of the matrix resin of glass fiber-reinforced thermoplastics that can be used include thermoplastic resins such as a polyamide resin, a polyethylene terephthalate resin, a polybutylene terephthalate resin, a polycarbonate resin, a polypropylene resin, an ABS resin, an AS resin, an polyacetal resin, a modified polyphenyleneoxide resin, a polyphenylenesulfide resin, a polyarylenesulfide resin, and a liquid crystal polyester resin. The matrix resin thereof is particularly preferably a polypropylene resin, a modified polyphenyleneoxide resin, a polyphenylenesulfide resin, or a polyarylenesulfide resin for excellent acid resistance and excellent alkali resistance.

Best Mode for Carrying Out the Invention

Next, the present invention will be described in detail based on examples.

Tables 1 to 3 show Examples A to P of the glass fiber according to the present invention, and Table 4 shows Comparative Examples Q to V of the glass fiber. Table 5 shows Examples 1 to 4 of an FRP rod according to the present invention, and Table 6 shows Comparative Examples 1 and 2 of an FRP rod. Tables 7 and 8 show Examples 5 to 13 of a repairing material for a cement-based material according to the present invention, and Table 9 shows Comparative Examples 3 to 6 of a repairing material for a cement-based material. Tables 10 and 11 show Examples 14 to 22 of the glass fiber-reinforced resin pipe according to the present invention, and Table 12 shows Comparative Examples 7 to 10 of a glass fiber-reinforced resin pipe. Tables 13 and 14 show Examples 23 to 31 of a sheet molding compound according to the present invention, and Table 15 shows Comparative Examples 11 to 14 of a sheet molding compound. Tables 16 and 17 show Examples 32 to 40 of glass fiber-reinforced thermoplastics according to the present invention, and Table 18 shows Comparative Examples 15 to 18 of glass fiber-reinforced thermoplastic.

TABLE 1

| | | Example | | | |
|---|---|---|---|---|---|
| | A | B | C | D | E |
| $SiO_2$ | 57.7 | 54.8 | 52.6 | 50.4 | 58.5 |
| $Al_2O_3$ | 1.5 | 3.6 | 2.3 | 0.6 | 4.7 |
| $B_2O_3$ | — | — | — | — | — |
| MgO | — | 7.6 | 8.6 | 8.0 | 6.5 |
| CaO | 9.6 | 7.7 | 7.1 | 9.7 | 4.3 |
| SrO | 9.7 | 7.7 | 8.2 | 9.5 | 7.6 |
| BaO | 10.0 | 7.6 | 6.5 | 11.6 | 5.6 |
| $TiO_2$ | 9.6 | 9.2 | 8.6 | 7.0 | 11.3 |
| $ZrO_2$ | 1.9 | 1.8 | 6.1 | 3.2 | 1.5 |
| $Li_2O$ | — | — | — | — | — |
| $Na_2O$ | — | — | — | — | — |
| $K_2O$ | — | — | — | — | — |
| $Nb_2O_5$ | — | — | — | — | — |
| $La_2O_3$ | — | — | — | — | — |
| BaO/CaO | 1.04 | 0.99 | 0.92 | 1.20 | 1.30 |
| SrO/CaO | 1.01 | 1.00 | 1.15 | 0.98 | 1.77 |
| MgO/CaO | 0.00 | 0.99 | 1.21 | 0.82 | 1.51 |
| $Li_2O + Na_2O + K_2O$ | — | — | — | — | — |
| MgO + CaO + SrO + BaO | 29.3 | 30.6 | 30.4 | 38.8 | 24.0 |
| Glass fiber Spinning temperature $T_X$ (° C.) | 1,155 | 1,162 | 1,172 | 1,156 | 1,184 |
| Devitrification temperature $T_Y$ (° C.) | 1,084 | 1,081 | 1,095 | 1,078 | 1,110 |
| $T_X - T_Y$ (° C.) | 71 | 81 | 77 | 78 | 74 |
| Alkali resistance (%) | 0.6 | 0.7 | 0.2 | 0.5 | 0.6 |
| Acid resistance (%) | 0.8 | 1.0 | 0.7 | 0.9 | 1.0 |
| Amount of alkali elution (mg) | 0 | 0 | 0 | 0 | 0 |
| Tensile strength (MPa) | 1,150 | 1,100 | 1,100 | 1,050 | 1,150 |

TABLE 2

| | | Example | | | |
|---|---|---|---|---|---|
| | F | G | H | I | J |
| $SiO_2$ | 52.8 | 56.3 | 54.3 | 51.2 | 50.6 |
| $Al_2O_3$ | 7.2 | 1.5 | 0.3 | 1.2 | 1.0 |
| $B_2O_3$ | — | — | — | — | — |
| MgO | 6.3 | 8.2 | 4.9 | 10.6 | 5.8 |
| CaO | 5.6 | 6.8 | 12.2 | 7.7 | 9.8 |
| SrO | 11.1 | 6.9 | 7.1 | 5.9 | 10.9 |
| BaO | 8.0 | 7.7 | 9.7 | 10.3 | 7.5 |
| $TiO_2$ | 7.8 | 9.8 | 10.2 | 8.2 | 12.6 |
| $ZrO_2$ | 1.2 | 2.3 | 1.0 | 4.7 | 1.3 |
| $Li_2O$ | — | — | — | 0.2 | 0.1 |
| $Na_2O$ | — | 0.5 | — | — | 0.2 |
| $K_2O$ | — | — | 0.3 | — | 0.2 |
| $Nb_2O_5$ | — | — | — | — | — |
| $La_2O_3$ | — | — | — | — | — |
| BaO/CaO | 1.43 | 1.13 | 0.80 | 1.34 | 0.77 |
| SrO/CaO | 1.98 | 1.01 | 0.58 | 0.77 | 1.11 |
| MgO/CaO | 1.13 | 1.21 | 0.40 | 1.38 | 0.59 |
| $Li_2O + Na_2O + K_2O$ | — | 0.5 | 0.3 | 0.2 | 0.5 |
| MgO + CaO + SrO + BaO | 31.0 | 29.6 | 33.9 | 34.5 | 34.0 |

TABLE 2-continued

|  |  | Example | | | | |
|---|---|---|---|---|---|---|
|  |  | F | G | H | I | J |
| Glass fiber | Spinning temperature $T_X$ (° C.) | 1,158 | 1,174 | 1,158 | 1,153 | 1,150 |
|  | Devitrification temperature $T_Y$ (° C.) | 1,085 | 1,098 | 1,088 | 1,082 | 1,079 |
|  | $T_X - T_Y$ (° C.) | 73 | 76 | 70 | 71 | 71 |
|  | Alkali resistance (%) | 0.8 | 0.5 | 0.6 | 0.3 | 0.7 |
|  | Acid resistance (%) | 1.3 | 1.2 | 0.9 | 0.8 | 1.3 |
|  | Amount of alkali elution (mg) | 0 | <0.01 | <0.01 | <0.01 | <0.01 |
|  | Tensile strength (MPa) | 1,100 | 1,150 | 1,100 | 1,100 | 1,050 |

TABLE 3

|  | Example | | | | | |
|---|---|---|---|---|---|---|
|  | K | L | M | N | O | P |
| $SiO_2$ | 53.5 | 52.4 | 56.3 | 53.5 | 50.5 | 52.6 |
| $Al_2O_3$ | 5.1 | 2.1 | 1.4 | 2.7 | 3.4 | 3.6 |
| $B_2O_3$ | — | 5.7 | — | — | 7.4 | 2.1 |
| MgO | 7.4 | 7.2 | 8.0 | 8.7 | 6.0 | 7.7 |
| CaO | 6.1 | 7.5 | 6.4 | 7.8 | 5.8 | 7.6 |
| SrO | 7.4 | 7.2 | 7.0 | 7.0 | 6.9 | 7.7 |
| BaO | 7.8 | 7.6 | 8.1 | 7.1 | 6.7 | 7.7 |
| $TiO_2$ | 10.3 | 9.1 | 8.3 | 10.5 | 7.1 | 9.2 |
| $ZrO_2$ | 2.4 | 1.2 | 3.6 | 0.9 | 4.9 | 1.8 |
| $Li_2O$ | — | — | — | — | 0.5 | — |
| $Na_2O$ | — | — | 0.6 | 1.4 | 0.6 | — |
| $K_2O$ | — | — | 0.3 | 0.4 | 0.2 | — |
| $Nb_2O_5$ | — | — | — | — | — | — |
| $La_2O_3$ | — | — | — | — | — | — |
| BaO/CaO | 1.28 | 1.02 | 1.27 | 0.91 | 1.15 | 0.99 |
| SrO/CaO | 1.21 | 0.96 | 1.09 | 0.91 | 1.20 | 1.00 |
| MgO/CaO | 1.21 | 0.96 | 1.25 | 1.12 | 1.04 | 0.99 |
| $Li_2O + Na_2O + K_2O$ | — | — | 0.9 | 1.8 | 1.3 | — |
| MgO + CaO + SrO + BaO | 28.7 | 29.5 | 29.5 | 30.6 | 25.4 | 30.7 |
| Glass fiber Spinning temperature $T_X$ (° C.) | 1,170 | 1,151 | 1,143 | 1,136 | 1,140 | 1,155 |
| Devitrification temperature $T_Y$ (° C.) | 1,078 | 1,078 | 1,071 | 1,062 | 1,068 | 1,078 |
| $T_X - T_Y$ (° C.) | 92 | 73 | 72 | 74 | 72 | 77 |
| Alkali resistance (%) | 0.4 | 0.7 | 0.5 | 0.7 | 0.5 | 0.6 |
| Acid resistance (%) | 1.0 | 1.1 | 1.0 | 1.5 | 1.3 | 1.0 |
| Amount of alkali elution (mg) | 0 | 0 | <0.01 | <0.01 | <0.01 | 0 |
| Tensile strength (MPa) | 1,100 | 1,050 | 1,100 | 1,050 | 1,050 | 1,100 |

TABLE 4

|  | Comparative Example | | | | | |
|---|---|---|---|---|---|---|
|  | Q | R | S | T | U | V |
| $SiO_2$ | 58.0 | 52.6 | 53.5 | 54.0 | 57.0 | 65.2 |
| $Al_2O_3$ | — | 0.8 | 1.4 | 1.0 | 8.6 | — |
| $B_2O_3$ | — | — | — | — | 5.7 | — |
| MgO | — | — | 9.6 | — | 1.2 | — |
| CaO | 5.7 | 8.6 | 15.6 | 7.0 | 26.0 | 1.0 |
| SrO | 5.8 | 5.7 | 3.9 | 7.0 | 0.1 | — |
| BaO | 11.5 | 14.3 | 4.3 | 15.0 | — | — |
| $TiO_2$ | 7.0 | 10.9 | 8.8 | 12.5 | 1.0 | 3.4 |
| $ZrO_2$ | 5.0 | 2.3 | 2.9 | 3.5 | — | 12.0 |
| $Li_2O$ | — | — | — | — | 0.2 | 2.7 |
| $Na_2O$ | 7.0 | — | — | — | 0.2 | 12.3 |
| $K_2O$ | — | — | — | — | — | 3.4 |
| $Nb_2O_5$ | — | 3.2 | — | — | — | — |

TABLE 4-continued

|  | Comparative Example | | | | | |
|---|---|---|---|---|---|---|
|  | Q | R | S | T | U | V |
| La$_2$O$_3$ | — | 1.6 | — | — | — | — |
| BaO/CaO | 2.02 | 1.66 | 0.28 | 2.14 | — | — |
| SrO/CaO | 1.02 | 0.66 | 0.25 | 1.00 | 0.00 | — |
| MgO/CaO | 0.00 | 0.00 | 0.62 | 0.00 | 0.05 | — |
| Li$_2$O + Na$_2$O + K$_2$O | 7.0 | — | — | — | 0.4 | 18.4 |
| MgO + CaO + SrO + BaO | 23.0 | 28.6 | 33.4 | 29.0 | 27.3 | 1 |
| Glass fiber Spinning temperature T$_X$ (° C.) | 1,109 | 1,170 | 1,100 | 1,132 | 1,187 | 1,246 |
| Devitrification temperature T$_Y$ (° C.) | 1,034 | 1,070 | 1,194 | 1,204 | 1,039 | 1,147 |
| T$_X$ − T$_Y$ (° C.) | 75 | 100 | −94 | −72 | 148 | 99 |
| Alkali resistance (%) | 0.5 | 0.2 | 0.5 | 0.2 | 1.8 | 0.7 |
| Acid resistance (%) | 1.8 | 1.3 | 0.6 | 0.8 | 20.6 | 0.2 |
| Amount of alkali elution (mg) | 0.05 | 0 | 0 | 0 | <0.01 | 0.3 |
| Tensile strength (MPa) | 1,100 | 1,000 | — | — | 1,200 | 1,000 |

The glass fiber of Examples A to P and Comparative Examples Q to V in Tables 1 to 4 was produced as described below.

First, a glass raw material batch prepared by weighing and mixing the glass raw materials into each glass composition shown in Tables was placed in a platinum crucible, and the batch was melted by using an electric furnace at 1,500° C. for about 4 hours. A glass melt was stirred by using a stirring rod during glass melting to obtain homogeneous glass.

The glass melt was then poured into a carbon jig, to thereby obtain a glass molded product.

Next, the above-described glass molded product was charged into a glass fiber production furnace and was spun at a spinning temperature shown in Tables. 800 glass filaments each having a fiber diameter of 13 μm were gathered, to thereby produce a glass strand (glass fiber).

TABLE 5

| FRP rod | | | Example 1 | Example 2 | Example 3 | Example 4 |
|---|---|---|---|---|---|---|
| Glass fiber | | | A | B | C | D |
| LOI; amount of sizing (mass %) | | | 0.5 | 0.5 | 0.5 | 0.5 |
| Sizing (mass %) | Methacryl silane | | 0.3 | 0.4 | — | 0.6 |
|  | Epoxy silane | | — | — | 0.4 | — |
|  | Ureido silane | | 0.4 | 0.3 | 0.3 | 0.4 |
|  | Aminosilane | | — | — | — | — |
|  | Polyester resin | | 4 | — | — | 2 |
|  | Epoxy resin | | — | 4 | 4 | 2 |
| Matrix resin | | | Vinyl ester resin | Vinyl ester resin | Epoxy resin | Vinyl ester resin |
| Tensile strength (Mpa) | Normal state | | 1,189 | 1,192 | 1,201 | 1,183 |
|  | Alkali resistance | After 30 days | 1,183 | 1,170 | 1,194 | 1,168 |
|  |  | After 60 days | 1,172 | 1,175 | 1,188 | 1,163 |
|  | Acid resistance | After 30 days | 1,180 | 1,178 | 1,192 | 1,173 |
|  |  | After 60 days | 1,175 | 1,177 | 1,190 | 1,170 |

TABLE 6

| FRP rod | | Comparative Example 1 | Comparative Example 2 |
|---|---|---|---|
| Glass fiber | | U | V |
| LOI; amount of sizing (mass %) | | 0.5 | 0.5 |
| Sizing (mass %) | Methacryl silane | 0.4 | 0.6 |
|  | Epoxy silane | — | — |
|  | Ureido silane | 0.3 | 0.4 |
|  | Aminosilane | — | — |
|  | Polyester resin | — | 2 |
|  | Epoxy resin | 4 | 2 |
| Matrix resin | | Vinyl ester resin | Vinyl ester resin |

TABLE 6-continued

| FRP rod | | | Comparative Example 1 | Comparative Example 2 |
|---|---|---|---|---|
| Tensile strength (MPa) | Normal state | | 1,225 | 1,120 |
| | Alkali resistance | After 30 days | 919 | 1,018 |
| | | After 60 days | 675 | 875 |
| | Acid resistance | After 30 days | 1,021 | 1,029 |
| | | After 60 days | 782 | 909 |

The FRP rods of Examples 1 to 4 and Comparative Examples 1 and 2 in Tables 5 and 6 were produced as described below.

After the above-described glass molded product was charged into a glass fiber production furnace, a sizing shown in Tables 5 and 6 was applied on a surface of the glass filaments prepared by spinning at a spinning temperature shown in Tables 1 to 4 and having a fiber diameter of 13 μm by using an applicator such that LOI (loss on ignition) was 0.5 mass %. A glass strand formed by gathering 800 glass filaments was wound around a paper tube, to thereby produce a cake. 8 glass strands unwound from an outer layer of the cake were bundled, to produce glass roving. 23 rolls of glass roving were bundled through pultrusion method by using a vinyl ester resin (RIPOXY R802, available from Showa Highpolymer Co., Ltd.) or an epoxy resin (EPICLON 850, available from Dainippon Ink And Chemicals, Inc.), to thereby obtain the FRP rods of Examples 1 to 4 and Comparative Examples 1 and 2 having a glass fiber content of 66 vol %, having a round bar shape with 6 mm in diameter and 40 cm in length, and reinforced in one direction.

TABLE 7

| Glass fiber-reinforced resin sheet | | Example 5 | Example 6 | Example 7 | Example 8 | Example 9 |
|---|---|---|---|---|---|---|
| Glass fiber | | A | B | C | D | E |
| Tensile strength/ Mpa | Normal state | 116 | 114 | 113 | 110 | 116 |
| | After 30 days (alkali resistance) | 113 | 112 | 110 | 107 | 114 |
| | After 30 days (acid resistance) | 113 | 111 | 111 | 108 | 113 |

TABLE 8

| Glass fiber-reinforced resin sheet | | Example 10 | Example 11 | Example 12 | Example 13 |
|---|---|---|---|---|---|
| Glass fiber | | F | G | H | I |
| Tensile strength/ Mpa | Normal state | 113 | 116 | 112 | 114 |
| | After 30 days (alkali resistance) | 111 | 114 | 110 | 112 |
| | After 30 days (acid resistance) | 110 | 115 | 108 | 111 |

TABLE 9

| Glass fiber-reinforced resin sheet | | Comparative Example 3 | Comparative Example 4 | Comparative Example 5 | Comparative Example 6 |
|---|---|---|---|---|---|
| Glass fiber | | Q | R | U | V |
| Tensile strength/ Mpa | Normal state | 104 | 101 | 116 | 99 |
| | After 30 days (alkali resistance) | 91 | 86 | 84 | 88 |
| | After 30 days (acid resistance) | 90 | 84 | 83 | 87 |

The glass fiber-reinforced resin sheets of Examples 5 to 13 and Comparative Examples 3 to 6 in Tables 7 and 8 were produced as described below.

A sizing containing starch, a lubricant, a surfactant, a cationic softening agent, and a preservative was applied onto a surface of the glass filament having a fiber diameter of 13 μm by using an applicator such that LOI was 1.0 mass %. A glass strand formed by bundling 400 glass filaments was wound around a paper tube, to thereby produce a cake. The glass strand was unwound from an outer layer of the cake, and the glass yarn dried in air was wound around a bobbin while twisting the yarn at 0.7 Z. Next, the glass yarn unwound from an outer layer of the bobbin was woven into a plain weave by using an air jet loom, to thereby produce a glass fabric having a warp and a weft of the same density of 115 g/m$^2$ (total density is 230 g/m$^2$). The glass fabric was subjected to heat cleaning at 350 to 400° C., immersed in an organic silane solution, and dried at 120° C. for a few minutes, to thereby obtain a glass fabric having about 1 mass % of organic silane applied thereon. Finally, the glass fabric was impregnated with a vinyl ester resin (RIPOXY R802, available from Showa Highpolymer Co., Ltd.) such that a glass fiber content was adjusted to 15 vol %, to thereby obtain the glass fiber-reinforced resin sheet of each of Examples 5 to 13 and Comparative Examples 3 to 6 having the shape and size in accordance with those described in JISK 7054. The glass fiber-reinforced resin sheet was produced to study performance thereof as a repairing material for a cement-based material.

TABLE 10

| Glass fiber-reinforced resin pipe | | Example 14 | Example 15 | Example 16 | Example 17 | Example 18 |
|---|---|---|---|---|---|---|
| Glass fiber | | A | B | C | D | E |
| Pipe strength/ Mpa | Normal state | 655 | 645 | 642 | 643 | 658 |
| | After 30 days (alkali resistance) | 648 | 637 | 633 | 637 | 652 |
| | After 30 days (acid resistance) | 642 | 639 | 629 | 637 | 652 |

TABLE 11

| Glass fiber-reinforced resin pipe | | Example 19 | Example 20 | Example 21 | Example 22 |
|---|---|---|---|---|---|
| Glass fiber | | F | G | H | I |
| Pipe strength/ Mpa | Normal state | 647 | 653 | 649 | 645 |
| | After 30 days (alkali resistance) | 642 | 639 | 635 | 631 |
| | After 30 days (acid resistance) | 637 | 647 | 643 | 630 |

TABLE 12

| Glass fiber-reinforced resin pipe | | Comparative Example 7 | Comparative Example 8 | Comparative Example 9 | Comparative Example 10 |
|---|---|---|---|---|---|
| Glass fiber | | Q | R | U | V |
| Pipe strength/ MPa | Normal state | 618 | 572 | 650 | 585 |
| | After 30 days (alkali resistance) | 524 | 491 | 488 | 483 |
| | After 30 days (acid resistance) | 530 | 504 | 478 | 492 |

The glass fiber-reinforced resin pipes of Examples 14 to 22 and Comparative Examples 7 to 10 in Tables 10 to 12 were produced as described below.

A sizing containing methacryl silane and an epoxy resin was applied onto a surface of the glass filament having a fiber diameter of 13 μm by using an applicator such that LOI was 0.5 mass %. A glass strand formed by gathering 800 glass filaments was wound around a paper tube, to thereby produce a cake. 8 glass strands unwound from an outer layer of the cake were bundled, to produce a glass roving. The glass roving was adjusted to have a glass fiber content of 45 vol % through filament winding method by using a vinyl ester resin (RIPOXY R802, available from Showa Highpolymer Co., Ltd.), to thereby obtain the glass fiber-reinforced pipe of Examples 14 to 22 and Comparative Examples 7 and 10 having an inner diameter of 80 mm and thickness of 3 mm.

TABLE 13

| SMC sheet | | Example 23 | Example 24 | Example 25 | Example 26 | Example 27 |
|---|---|---|---|---|---|---|
| Glass fiber | | A | B | C | D | E |
| Bending strength/ MPa | Normal state | 175 | 174 | 174 | 173 | 175 |
| | After 30 days (alkali resistance) | 172 | 170 | 172 | 171 | 171 |
| | After 1,000 hours (acid resistance) | 172 | 172 | 171 | 170 | 172 |

TABLE 14

| SMC sheet | | Example 28 | Example 29 | Example 30 | Example 31 |
|---|---|---|---|---|---|
| Glass fiber | | F | G | H | I |
| Bending strength/ MPa | Normal state | 174 | 175 | 173 | 174 |
| | After 30 days (alkali resistance) | 170 | 171 | 170 | 171 |
| | After 1,000 hours (acid resistance) | 171 | 172 | 171 | 172 |

TABLE 15

| SMC sheet | | Comparative Example 11 | Comparative Example 12 | Comparative Example 13 | Comparative Example 14 |
|---|---|---|---|---|---|
| Glass fiber | | Q | R | U | V |
| Bending strength/ MPa | Normal state | 168 | 156 | 177 | 160 |
| | After 30 days (alkali resistance) | 142 | 134 | 127 | 132 |
| | After 1,000 hours (acid resistance) | 150 | 139 | 112 | 135 |

The SMC sheets of Examples 23 to 31 and Comparative Examples 11 to 14 in Tables 13 to 15 were produced as described below.

A sizing containing methacryl silane and a vinyl acetate resin was applied onto a surface of the glass filament having a fiber diameter of 13 μm by using an applicator such that LOI was 1.0 mass %. A glass strand formed by gathering 200 glass filaments was wound around a paper tube, to thereby produce a cake. Glass strands unwound from an outer layer of the cakes were bundled, to produce a glass roving of 4,000 tex. The glass roving was cut into one inch length at a cutting speed of 50 m/min, to thereby produce glass chopped strands. The glass chopped strands were impregnated with a sheet molding resin containing 75 parts by mass of an unsaturated polyester resin, 25 parts by mass of a shrinkage reducing agent, 60 parts by mass of calcium carbonate, 60 parts by mass of aluminum hydroxide, 5 parts by mass of a pigment, 1 part by mass of a curing agent, and 0.03 part by mass of a polymerization inhibitor through a common procedure such that a glass fiber content was adjusted to 16 vol %. The impregnated glass chopped strand was matured at 40° C. for 10 hours, subjected to press molding at 140° C. and a pressure of 9 MPa for 4 min, and subjected to cutting process, to thereby obtain the SMC sheets of Examples 23 to 31 and Comparative Examples 11 to 14 having 3 mm thickness, 25 mm width, and 80 mm length.

TABLE 16

| BMC sheet | | Example 32 | Example 33 | Example 34 | Example 35 | Example 36 |
|---|---|---|---|---|---|---|
| Glass fiber | | A | B | C | D | E |
| Bending strength/ MPa | Normal state | 120 | 119 | 120 | 119 | 119 |
| | After 30 days (alkali resistance) | 102 | 107 | 101 | 106 | 103 |
| | After 100 days (acid resistance) | 105 | 104 | 102 | 104 | 105 |

TABLE 17

| BMC sheet | | Example 37 | Example 38 | Example 39 | Example 40 |
|---|---|---|---|---|---|
| Glass fiber | | F | G | H | I |
| Bending strength/ MPa | Normal state | 118 | 119 | 118 | 120 |
| | After 30 days (alkali resistance) | 103 | 100 | 105 | 101 |
| | After 100 days (acid resistance) | 105 | 103 | 104 | 102 |

TABLE 18

| BMC sheet | | Comparative Example 15 | Comparative Example 16 | Comparative Example 17 | Comparative Example 18 |
|---|---|---|---|---|---|
| Glass fiber | | Q | R | U | V |
| Bending stength/ MPa | Normal state | 109 | 120 | 121 | 101 |
| | After 30 days (alkali resistance) | 80 | 79 | 82 | 83 |
| | After 100 days (acid resistance) | 80 | 83 | 88 | 82 |

The BMC sheets of Examples 32 to 40 and Comparative Examples 15 to 18 in Tables 16 to 18 were produced as described below.

A sizing containing aminosilane and a vinyl acetate resin was applied onto a surface of a glass filament having a fiber diameter of 10 μm by using an applicator such that LOI was 0.5 mass %. A glass strand formed by gathering 800 glass filaments was wound around a paper tube, to thereby produce a cake. The glass strand was cut into 6 mm in length while being unwound from the cake and was dried, to thereby obtain glass chopped strands. The glass chopped strands were kneaded with a bulk molding resin containing 65 parts by mass of an unsaturated polyester resin, 34 parts by mass of a shrinkage reducing agent, 250 parts by mass of calcium carbonate, 5 parts by mass of a pigment, 1.5 parts by mass of a curing agent, and 0.08 part by mass of a polymerization inhibitor by using a kneader such that a glass fiber content was adjusted to 10 vol %. The kneaded glass chopped strand was matured and then subjected to injection molding, to thereby obtain the BMC sheets of Examples 32 to 40 and Comparative Examples 15 to 18.

TABLE 19

| FRTP sheet | | | Example 41 | Example 42 | Example 43 | Example 44 | Example 45 |
|---|---|---|---|---|---|---|---|
| Glass fiber | | | A | B | C | D | E |
| LOI; amount of sizing (mass %) | | | 0.5 | 0.5 | 0.5 | 0.5 | 1.3 |
| Sizing (mass %) | Aminosilane | | 1 | 1 | 1 | 0.5 | 2 |
| | Modified polypropylene resin | | 4 | 4 | 4 | 4 | 10 |
| | Urethane resin | | 1 | 1 | 1 | 1 | 2 |
| | Epoxy resin | | — | — | — | — | — |
| Matrix resin | | | Polypropylene resin | Polypropylene resin | Polypropylene resin | Polypropylene resin | Polypropylene resin |
| Tensile strength (MPa) | Normal state | | 95 | 95 | 95 | 93 | 98 |
| | Alkali resistance | After 500 hours | 59 | 60 | 59 | 58 | 63 |
| | | After 1,000 hours | 50 | 51 | 51 | 49 | 53 |
| | Acid resistance | After 500 hours | 74 | 75 | 75 | 73 | 78 |
| | | After 1,000 hours | 61 | 60 | 60 | 59 | 64 |

TABLE 20

| FRTP sheet | | | Example 46 | Example 47 | Example 48 | Example 49 | Example 50 |
|---|---|---|---|---|---|---|---|
| Glass fiber | | | A | B | C | D | E |
| LOI; amount of sizing (mass %) | | | 0.8 | 0.8 | 0.8 | 0.8 | 0.4 |
| Sizing (mass %) | Aminosilane | | 1 | 1 | 1 | 1 | 0.5 |
| | Modified polypropylene resin | | — | — | — | — | — |
| | Urethane resin | | 4 | 4 | 4 | 4 | 2 |
| | Epoxy resin | | 4 | 4 | 4 | 4 | 2 |
| Matrix resin | | | Polyphenylene sulfide resin | Polyphenylene sulfide resin | Polyphenylene sulfide resin | Polyphenylene sulfide resin | Polyphenylene sulfide resin |
| Tensile strength (MPa) | Normal state | | 183 | 183 | 184 | 183 | 184 |
| | Alkali resistance | After 500 hours | 121 | 122 | 123 | 121 | 120 |
| | | After | 103 | 102 | 103 | 103 | 100 |

TABLE 20-continued

| FRTP sheet | | | Example 46 | Example 47 | Example 48 | Example 49 | Example 50 |
|---|---|---|---|---|---|---|---|
| | Acid resistance | After 1,000 hours | 149 | 150 | 148 | 151 | 149 |
| | | After 500 hours | | | | | |
| | | After 1,000 hours | 122 | 122 | 121 | 125 | 119 |

TABLE 21

| FRTP sheet | | | Comparative Example 19 | Comparative Example 20 | Comparative Example 21 | Comparative Example 22 |
|---|---|---|---|---|---|---|
| Glass fiber | | | U | V | U | V |
| LOI; amount of sizing (mass %) | | | 0.5 | 0.5 | 0.8 | 0.8 |
| Sizing (mass %) | Aminosilane | | 1 | 1 | 1 | 1 |
| | Modified polypropylene resin | | 4 | 4 | — | — |
| | Urethane resin | | 1 | 1 | 4 | 4 |
| | Epoxy resin | | — | — | 4 | 4 |
| Matrix resin | | | Polypropylene resin | Polypropylene resin | Polyphenylene sulfide resin | Polyphenylene sulfide resin |
| Tensile strength (MPa) | Normal state | | 95 | 85 | 183 | 151 |
| | Alkali resistance | After 500 hours | 54 | 46 | 110 | 87 |
| | | After 1,000 hours | 41 | 43 | 77 | 81 |
| | Acid resistance | After 500 hours | 68 | 58 | 133 | 108 |
| | | After 1,000 hours | 46 | 49 | 98 | 99 |

The FRTP sheets of Examples 41 to 50 and Comparative Examples 19 to 22 in Tables 19 to 21 were produced as described below.

A sizing shown in Tables 19 to 21 was applied onto a surface of the glass filament having a fiber diameter of 13 μm by using an applicator to LOI shown in Tables. A glass strand formed by gathering 800 glass filaments was wound around a paper tube, to thereby produce a cake. The glass strand was cut into 3 mm in length while being unwound from the cake and was dried, to thereby obtain glass chopped strands. The glass chopped strands and a matrix resin shown in Tables 19 to 21 were kneaded by using an extruder, and the kneaded product was pelletized by using a pelletizer. The pellets were subjected to injection molding, to thereby obtain the FRTP sheets of Examples 41 to 50 and Comparative Examples 19 to 22. A glass fiber content in the FRTP sheets was 13 vol % for Examples 41 to 45 and Comparative Examples 19 and 20, and 26 vol % for Examples 46 to 50 and Comparative Examples 21 and 22. Temperatures for kneading and injection molding were both 250° C. for Examples 41 to 45 and Comparative Examples 19 and 20, and both 320° C. for Examples 46 to 50 and Comparative Examples 21 and 22.

Tables 1 to 3 clearly show that the glass fibers of Examples A to P each contained a large amount of $ZrO_2$ or $TiO_2$, but had an appropriate mol ratio of BaO to CaO, that is, BaO/CaO, and thus could suppress devitrification during spinning substantially without inclusion of alkali metal oxides, $Nb_2O_5$, or $La_2O_3$, had a devitrification temperature ($T_y$) not exceeding a spinning temperature ($T_x$), and had a difference ($T_x$-$T_y$) between the temperatures of 70° C. or more. The glass fibers each contained a large amount of $ZrO_2$ or $TiO_2$ and thus had excellent alkali resistance or excellent acid resistance, and contained no $Nb_2O_5$ or $La_2O_3$ and thus had a high tensile strength. The glass fiber each contained alkali metal oxides in a total content of 2% or less and thus had a small amount of alkali elution. Therefore, the FRP rods of Examples 1 to 4, the glass fiber-reinforced resin sheets of Examples 5 to 13, the glass fiber-reinforced resin pipes of Examples 14 to 22, the SMC sheets of Examples 23 to 31, the BMC sheets of Examples 32 to 40, and the FRTP sheets of Examples 41 to 50 each had high initial mechanical strength, and hardly degraded mechanical strength after immersion in an alkali and acid solution for a long period of time.

In contrast, the glass fiber of Comparative Example Q contained alkali metal oxides in a total content of no less than 7% and thus had a large amount of alkali elution from glass although the glass fiber had a large difference between the spinning temperature and the devitrification temperature. Therefore, the glass fiber-reinforced resin sheet of Comparative Example 3, the glass fiber-reinforced resin pipe of Comparative Example 7, the SMC sheet of Comparative Example 11, and the BMC sheet of Comparative Example 15 each had low initial mechanical strength. The glass fiber of Comparative Example R contained $Nb_2O_5$ or $La_2O_3$ and thus had low tensile strength although the glass fiber had a large difference between the spinning temperature and the devitrification temperature. Therefore, the glass fiber-reinforced resin sheet of Comparative Example 4, the glass fiber-reinforced resin pipe of Comparative Example 8, the SMC sheet of Comparative Example 12, and the BMC sheet of Comparative Example 16 each had low initial mechanical strength. The glass fiber of Comparative Example S had a BaO/CaO mol ratio of less than 0.3, and the glass fiber of Comparative Example T had a BaO/CaO mol ratio of more than 1.6, and thus the glass fibers each had a devitrification temperature higher than a spinning temperature and could not be spun. The glass fiber of Comparative Example U contained no $ZrO_2$ and thus had poor alkali and acid resistance. Therefore, the FRP rod of Comparative Example 1, the glass fiber-reinforced resin sheet of Comparative Example 5, the glass fiber-reinforced resin pipe of Comparative Example 9, the SMC sheet of Comparative Example 13, the BMC sheet of Comparative Example 17, and the FRTP sheets of Comparative Examples 19 and 21 each had significantly degraded mechanical strength after immersion in an alkali and acid solution for a long period of time. The glass fiber of Comparative Example V contained alkali metal oxides in a total content of no less than 18.4% and thus had a large amount of alkali elution from glass. Therefore, the FRP rod of Comparative Example 2, the glass fiber-reinforced resin sheet of Comparative Example 6, the glass fiber-reinforced resin pipe of Comparative Example 10, the SMC sheet of Comparative Example 14, the BMC sheet of Comparative Example 18, and the FRTP sheets of Comparative Examples 20 and 22 each had low initial mechanical strength, and significantly degraded mechanical strength after immersion in an alkali and acid solution for a long period of time.

The properties shown in Tables were determined as described below.

The spinning temperature (temperature at melt viscosity of $10^3$ poise) was determined by: cutting out a part of each glass molded product; re-melting the part of the glass molded product in a platinum crucible under heating; and measuring the spinning temperature through platinum sphere pulling up method.

The devitrification temperature was determined by: cutting out a part of each glass molded product for pulverization; charging into a temperature gradient furnace a vessel filled with glass powder adjusted to have a particle size of 297 to 500 μm; keeping the vessel in the furnace for 16 hours; taking out the vessel; observing precipitated crystals with a microscope; and measuring a maximum temperature at which the crystals precipitated.

The alkali resistance and the acid resistance were determined by: cutting out a part of each glass molded product for pulverization; immersing glass powder adjusted to have a particle size of 297 to 500 μm in 100 ml of a 10 mass % aqueous solution of NaOH for alkali resistance, or in 100 ml of a 10 mass % aqueous solution of HCl for acid resistance; and evaluating amass reduction ratio (mass %) after shaking at 80° C. for 16 hours.

The amount of alkali elution was measured in accordance with JIS R 3502.

The tensile strength of the glass fiber was measured in accordance with JIS R 3420 by using the above-described glass strand.

The tensile strength of the FRP rod in a normal state, after immersion in a 1N aqueous solution of sodium hydroxide at 40° C. for 30 days and 60 days, and after immersion in a5 mass % aqueous solution of sulfuric acid at 40° C. for 30 days and 60 days was measured at a room temperature of 20±5° C. and a loading rate of 5 mm/min. The tensile strength of the glass fiber-reinforced resin sheet in a normal state, after immersion in a 1N aqueous solution of sodium hydroxide at 40° C. for 30 days, and after immersion in a 5 mass % aqueous solution of sulfuric acid at 40° C. for 30 days was measured in accordance with JISK 7054. Strength of the glass fiber-reinforced plastic pipe in a normal state, after immersion in a 1N aqueous solution of sodium hydroxide at 40° C. for 30 days, and after immersion in a 5 mass % aqueous solution of sulfuric acid at 40° C. for 30 days was measured in accordance with JIS K 6911. Bending strength of the SMC sheet in a normal state, after immersion in a 1N aqueous solution of sodium hydroxide at 40° C. for 30 days, and after immersion in a 10 mass % aqueous solution of sulfuric acid at 60° C. for 1,000 hours was measured in accordance with JIS K 7055. Bending strength of the BMC sheet in a normal state, after immersion in a 25 mass % aqueous solution of sodium hydroxide at 25° C. for 30 days, and after immersion in an 80 mass % aqueous solution of sulfuric acid at 25° C. for 100 days was measured in accordance with JIS K 6911. The tensile strength of the FRTP sheet in a normal state, after immersion in a 10 mass % aqueous solution of sodium hydroxide at 80° C. for 500 hours and 1,000 hours, and after immersion in a 10 mass % aqueous solution of sulfuric acid at 80° C. for 500 hours and 1,000 hours was measured in accordance with ASTM D638. Those measurements were performed with an Instron universal testing machine 4204. The FRP rod had grip portions each with length of 10 cm placed on both ends for fixing the rod to a displacement controlled testing machine. An unsaturated polyester resin was coated on surfaces of the grip portions for protection during fixing, and iron powder was allowed to adhere to the surface of the unsaturated polyester resin for slip prevention. Tensile strength test was carried out by using 10 FRP rods for one condition, and the tensile strength was determined as an average. A central portion (20 cm) of the FRP rod except the grip portions was immersed in an alkali solution or an acidic solution, taken out of the solution and washed with distilled water, dried for one day in a desiccator, and then subjected to strength testing. The glass fiber-reinforced plastic sheet had grip portions for fixing the sheet to a strength measuring apparatus, and a parallel portion to be immersed in an alkali solution or an acidic solution. The glass fiber-reinforced plastic sheet, the glass fiber-reinforced plastic pipe, the SMC sheet, the BMC sheet, and the FRTP sheet were each immersed in an alkali solution or an acidic solution, taken out of the solution and washed with distilled water, dried for one day in a desiccator, and then subjected to strength testing.

The invention claimed is:

1. Glass fiber formed of glass composition including 50 to 60% of $SiO_2$, 0.1 to 10% of $Al_2O_3$, 20 to 45% of MgO+CaO+SrO+BaO, 0.5 to 20% of $TiO_2$, 0.1 to 10% of $ZrO_2$, and 0 to 2% of $Li_2O+Na_2O+K_2O$ in terms of mol %, wherein a BaO/CaO mol ratio is from 0.3 to 1.6, and
wherein the glass composition contains no $Nb_2O_5$ and $La_2O_3$.

2. Glass fiber-reinforced plastics which employs as a reinforcement the glass fiber according to claim 1.

3. Glass fiber-reinforced thermosetting plastics which employs as a reinforcement the glass fiber according to claim 1.

4. FRP rod which employs as a reinforcement the glass fiber according to claim 1.

5. Glass fabric which employs the glass fiber according to claim 1.

6. A repairing material for a cement-based material which employs as a reinforcement the glass fabric according to claim 5.

7. Glass fiber-reinforced plastic pipe which employs as a reinforcement the glass fiber according to claim 1.

8. FRP sewage pipe which employs as a reinforcement the glass fiber according to claim 1.

9. A sheet molding compound which employs as a reinforcement the glass fiber according to claim 1.

10. A bulk molding compound which employs as a reinforcement the glass fiber according to claim 1.

11. Glass fiber-reinforced thermoplastics which employs as a reinforcement the glass fiber according to claim 1.

* * * * *